United States Patent

[11] 3,612,965

[72] Inventor Joseph France
Harwood, nr. Bolton, England
[21] Appl. No. 791,017
[22] Filed Jan. 14, 1969
[45] Patented Oct. 12, 1971
[73] Assignee T.M.M. (Research) Limited
Hartford Works, Oldham, Lancashire, England
[32] Priority Jan. 17, 1968
[33] Great Britain
[31] 2541/68

[54] DRIVING ARRANGEMENT FOR A TEXTILE DRAWTWISTING MACHINE
13 Claims, 1 Drawing Fig.
[52] U.S. Cl. .................................................. 318/7, 318/59, 318/81, 318/84
[51] Int. Cl. ..................................................... H02p 5/46
[50] Field of Search ......................................... 318/7, 59, 81, 84

[56] References Cited
UNITED STATES PATENTS
2,583,074 1/1952 Allbert ........................ 318/7 X
2,837,705 6/1958 Spuhler ........................ 318/7
3,079,538 2/1963 Yamashita .................... 318/7

Primary Examiner—Oris L. Rader
Assistant Examiner—H. Huberfeld
Attorney—Nolte and Nolte ABSTRACT: A driving arrangement for a drawtwisting machine for drawtwisting continuous filament yarn, comprising a draw zone including draw rolls for drawing the yarn, a takeup and twisting zone including a rotary spindle and a ring and traveler by means of which the drawn yarn is wound onto a package carried by the spindle, a DC electric draw roll motor for driving the draw rolls, a DC electric spindle motor for driving the spindle, common armature voltage control means to control the armature voltages applied to the motors to provide for a variation of the armature voltages from values giving rise to crawl speeds for the two motors for starting up purposes to values giving rise to normal running speeds for the two motors, and yield voltage control means to control the field voltages to be applied to the motors and including automatic means for adjusting the field voltage of the spindle motor thereby to control the speed thereof independently of the speed of the draw roll motor.

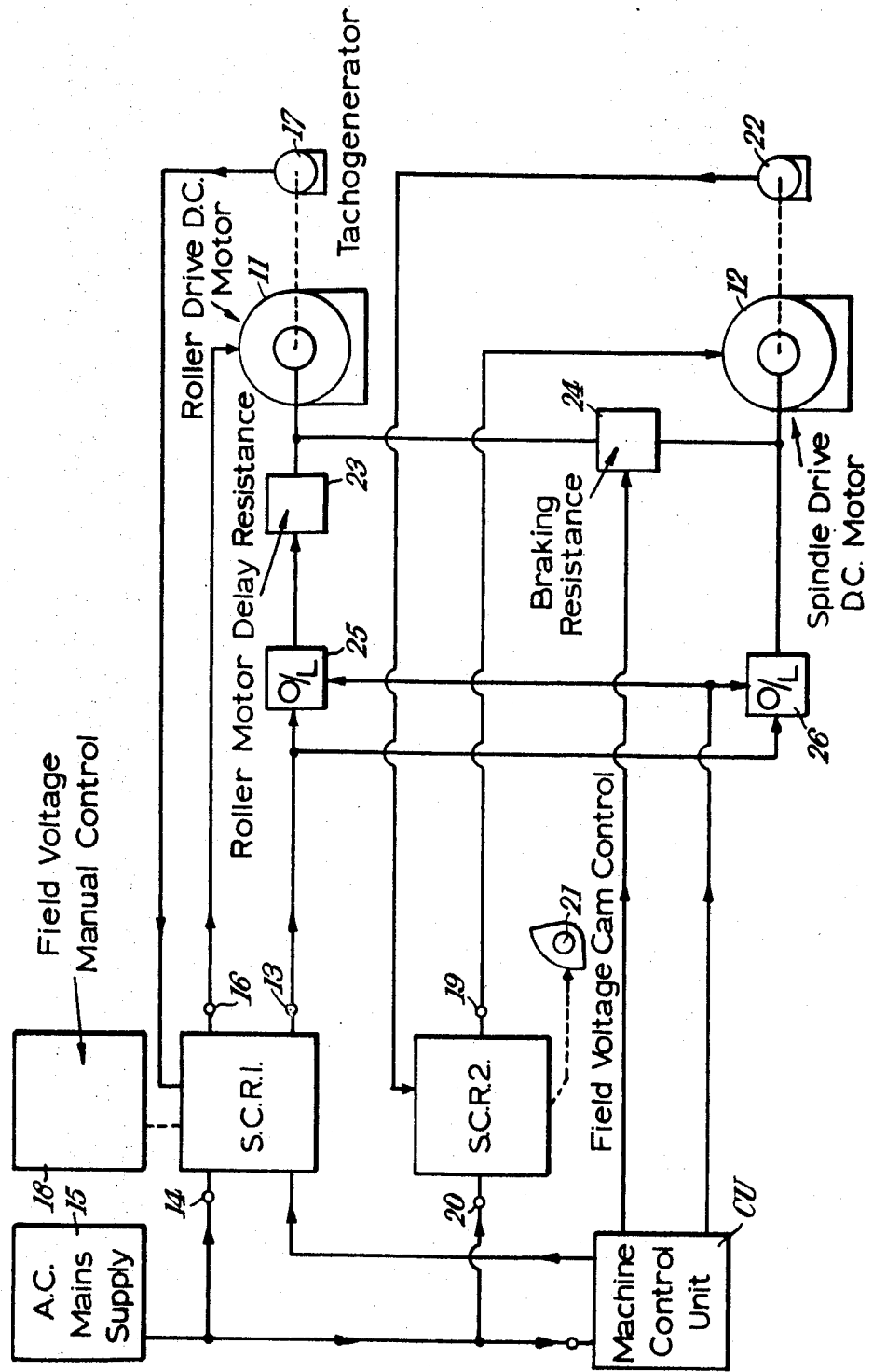

DRIVING ARRANGEMENT FOR A TEXTILE DRAWTWISTING MACHINE

The present invention relates to a textile drawtwisting machine used in the processing of synthetic textile materials of the continuous filament-type and of the kind in which filamentary material is drawn by means of draw rolls and then wound by means of a ring and traveller on to a package carried by a rotary spindle.

A drawtwisting machine of this kind in common use comprises a creel for supporting the material to be drawn and twisted, a draw zone in which the continuous filaments are drawn by passage successively over feed and draw rolls and a takeup and twisting zone in which the drawn filaments are wound by a ring and traveller on to a package carried by a rotary spindle. It is usual practice to drive the whole machine from a single electric motor through changeable gearing and to vary the speed relationship between the various machine parts as desired for different processing conditions by making appropriate changes to the gearing.

An object of the present invention is to provide an improved driving arrangement for a drawtwisting machine of the kind specified.

According to the present invention, in a drawtwisting machine of the kind specified, there is provided a driving arrangement comprising a first DC electric motor for driving the draw rolls, a second DC electric motor for driving the spindles, common armature voltage control means to control the armature voltages applied to the said motors, and field voltage control means to control the field voltages applied to said motors and including automatic means for adjusting the to the voltage of at least one of said motors.

The use of said common armature voltage control means enables the machine to run, as desired, at a very low or crawl speed for starting-up purposes and preferably means are provided for automatically changing over from crawl speed to normal running speed.

In the preferred embodiment of the invention hereinafter to be described, means are provided for automatically varying the field voltage of the spindle motor thereby to provide a control of the speed of the spindle motor, which is independent of the speed of the draw roll motor.

One embodiment of the invention will now be described by way of example with reference to the accompanying drawing which is a block schematic diagram of a driving arrangement for the draw and feed rolls and the spindles of a multiposition drawtwister.

At each position of the drawtwister continuous filament yarn is delivered by a creel to a drawing zone in which the yarn is advanced by a feed roll and drawn by means of a draw roll which is arranged to be driven at a speed greater than the feed roll and from which the drawn yarn is delivered to a takeup unit where it is wound into a package on a rotary spindle by means of a ring and traveller.

Referring now to the drawing, the draw and feed rolls are arranged to be driven by a first electric DC motor 11 hereinafter referred to as the draw roll motor, and a second electric DC motor 12, hereinafter referred to as the spindle motor, is provided to drive the spindles of the machine. The armature windings of each of the motors 11 and 12 are connected in parallel to a DC output terminal 13 of a silicon controlled rectifier unit SCR1 to an input terminal 14 of which is fed an AC voltage from a mains supply 15.

The rectifier unit SCR1 includes a first adjustable control element (not shown) by means of which the DC output voltage at the terminal 13 of the unit can be preset to provide basic running speeds for the two motors 11 and 12 and a second adjustable control element (not shown) which can be switched between two positions in one of which it gives rise to an armature voltage providing a very low or crawl speed for the two motors 11 and 12 to assist threading up of the machine and in the other of which the armature voltage provides the desired basic running speeds for the two motors, change over from crawl to running speed being carried out automatically by the further control element over a preselected time interval which may, for example, be from 10 to 30 seconds. The output shaft of the draw roll motor 11 is coupled to drive a tachogenerator 17, the output of which is fed back to the rectifier unit SCR1 as a negative feedback signal to form a closed loop armature control for the motor 11.

The voltage for the field windings of the draw roll motor 11 is also derived from the unit SCR1 at output terminal 16 and a third control element 18 is provided for manually varying the DC field voltage at the terminal.

The field windings of the spindle motor 12 are energized by a DC field voltage obtained from an output terminal 19 of a second silicon controlled rectifier unit SCR2 to an input terminal 20 of which the AC voltage from the mains supply 15 is fed. The further rectifier unit SCR2 is provided with a field voltage control element (not shown) which can be adjusted to vary the DC field voltage appearing at terminal 19 and applied to the spindle motor 12. The field voltage control element of the unit SCR2 comprises a rectilinear potentiometer the wiper of which is driveably engaged by the profile of a cam 21 which rotates during each package build to provide a programmed spindle motor speed variation. The output shaft of the spindle motor 12 is provided with a tachogenerator 22 which generates a feedback signal which is fed back to the second rectifier unit SCR2 as a negative feedback signal in opposition to the programmed field voltage to provide a closed loop field control for the motor 12.

For a predetermined set of operating conditions for the machine, the basic running speed is first set by overall adjustment of the armature voltage by the armature voltage control element of the first rectifier unit SCR1. The required difference in the speeds of the draw roll motor and the spindle motor is then obtained by manual adjustment of the field voltage control element of the rectifier unit SCR1 which results in a change in speed of the draw roll motor 11. The appropriate cam 21 for controlling the field voltage to the spindle motor 12 is fitted to provide the required variation in spindle speed during the build of the package, and the machine is then ready for operation.

Upon starting-up of the machine, the control element governing the crawl speed is set in response to a signal from a machine control unit CU so that the machine runs at crawl speed for threading up the yarns. After threading up the crawl speed control is switched over and the machine automatically brought to normal running speed in a controlled manner. The cam 21 controlling the field voltage to the spindle motor 12 automatically commences its excursion and the spindle speed is programmed by it throughout the package build.

The basic speed of the machine is always set by the draw roll motor 11, which determines the delivery speed of yarn to the spindles. The motors 11 and 12 may be identical and have a speed range of 1,000–2,000 r.p.m. by field control. The spindle speed may be expected to have a maximum variation in speed from empty to full package of, say, 2 to 1 that is to say, the motor 12 driving the spindles may start at 2,000 r.p.m. reducing to 1,000 r.p.m. (by field control) assuming that the unit SCR1 feeding the armatures is set at maximum volts.

The draw roll motor 11 could be set to run at, say, any speed between 1,000 and 2,000 r.p.m. by its own field control. The speed range required from the unit SCR1 feeding the armatures of the two motors 11 and 12 would be, say, a maximum of 3 to 1.

The crawl speed control should preferably be adjustable between 25 and 100 r.p.m., although the accuracy of speed control in crawl is not important.

The electrical linking of the armatures of the two motors 11 and 12 causes the spindle and feed and draw roll drives to accelerate substantially in ratio, and certainly good enough for drawtwister drives. On deceleration, the generation created by both armatures will keep them reasonably in ratio.

A resistor 23 is included in the armature circuit of the draw roll motor 11 to allow the spindles to lead on starting and is arranged automatically to cut out when the motors reach normal running speed.

A resistor 24 provides dynamic braking of the motors 11 and 12 on deceleration, being automatically connected across the armatures of the two motors in response to a signal from the control unit CU when the machine is switched off.

Overload switches 25 and 26 are provided in the armature circuits of the two motors 11 and 12 and can be reset by a signal from the control unit CU.

What I claim as my invention and desire to secure by Letters Patent is:

1. A driving arrangement for a drawtwisting machine for drawtwisting continuous filament yarn, comprising a draw zone including draw rolls for drawing the yarn, a takeup and twisting zone including a rotary spindle and a ring and traveller by means of which the drawn yarn is wound onto a package carried by the spindle, a DC electric draw roll motor for driving the draw rolls, a DC electric spindle motor for driving the spindle, common armature voltage control means to control the armature voltages applied to said motors to provide for a variation of said armature voltages from values giving rise to crawl speeds for the two motors for starting up purposes two motors, and field voltage control means to control the field voltages to be applied to said motors and including automatic means for adjusting the field voltage of said spindle motor thereby to control the speed thereof independently of the speed of the draw roll motor.

2. An arrangement according to claim 1, wherein said automatic means comprises a programmed element producing a field voltage variation which gives rise to a predetermined variation in the speed of the spindle during the build of a package.

3. An arrangement according to claim 2, wherein said programmed element comprises a rotary cam which rotates once during each package build and which has a profile drivingly engaging a control element controlling the field voltage applied to said spindle motor.

4. An arrangement according to claim 1, wherein said field voltage control means includes means to control the field voltage applied to said drawroll motor, independently of the field voltage applied to said spindle motor.

5. An arrangement according to claim 4, wherein said last-mentioned means includes a manually operable control element.

6. An arrangement according to claim 1, wherein means are provided for automatically changing over from crawl speed to normal running speed.

7. An arrangement according to claim 1, wherein said common armature voltage control means comprises a first adjustable control element which can be adjusted to provide basic running speeds for the two motors and a second adjustable control element which can be switched between two positions in one of which it gives rise to an armature voltage providing said crawl speeds for the two motors and in the other of which the armature voltage provides normal running speeds for the two motors.

8. An arrangement according to claim 7, wherein means are provided for automatically adjusting said second adjustable control element to effect a change over from crawl speeds to normal running speeds of the two motors over a predetermined time interval.

9. An arrangement according to claim 1, wherein said draw roll motor is coupled to drive a tachogenerator generating a negative feed back signal to provide closed loop armature control for said draw roll motor.

10. An arrangement according to claim 1, wherein said spindle motor is coupled to drive a tachogenerator generating a negative feed back signal to provide closed loop field control for the said spindle motor.

11. An arrangement according to claim 1, wherein said draw roll motor receives its armature and field voltages as DC output voltages from a first rectifier unit fed from an alternating current supply, wherein said spindle motor receives its armature voltage as a DC output voltage from the first rectifier unit and its field voltage as a DC output voltage from a second rectifier unit fed from said alternating current supply, and wherein said common armature voltage control means and said field voltage control means are such as to produce variations in the DC output voltages from the rectifier units.

12. An arrangement according to claim 1, including a resistance element connected in the armature circuit of said draw roll motor to allow the spindles to lead on starting up the machine and arranged automatically to cut out when the motors reach their normal running speeds.

13. An arrangement according to claim 1, comprising means automatically responsive to the switching off of the machine to connect a resistor across the armatures of the two motors to provide dynamic braking on deceleration.